United States Patent
Gabalski et al.

(10) Patent No.: US 7,364,236 B2
(45) Date of Patent: Apr. 29, 2008

(54) O-RING GROOVED STOP RIVET FOR REDUCING BUZZ, SQUEAK AND RATTLE ASSOCIATED WITH A MOTOR ACTUATED SEAT ASSEMBLY BETWEEN UPRIGHT DESIGN AND LOAD FLOOR POSITIONS

(75) Inventors: Jeff Gabalski, West Bloomfield, MI (US); Stephen Bruck, Howell, MI (US)

(73) Assignee: BAE Industries, Inc., Centerline, MI (US)

( * ) Notice: Subject to any disclaimer, the term of this patent is extended or adjusted under 35 U.S.C. 154(b) by 411 days.

(21) Appl. No.: 11/182,642

(22) Filed: Jul. 15, 2005

(65) Prior Publication Data

US 2007/0013223 A1   Jan. 18, 2007

(51) Int. Cl.
 *B60N 2/02* (2006.01)
(52) U.S. Cl. .................................. 297/378.1
(58) Field of Classification Search ............. 297/378.1, 297/463.1; 16/2.1, 273; 403/113, 226
See application file for complete search history.

(56) References Cited

U.S. PATENT DOCUMENTS

| | | | |
|---|---|---|---|
| 4,822,092 A | | 4/1989 | Sweers |
| 4,928,374 A | | 5/1990 | Allen |
| 5,104,190 A | * | 4/1992 | Siegrist .................. 297/362 |
| 5,156,439 A | * | 10/1992 | Idlani et al. ............... 297/367 |
| 5,292,171 A | * | 3/1994 | Harrell ...................... 297/113 |
| 5,951,108 A | * | 9/1999 | Bauer et al. ............ 297/378.12 |
| 6,186,595 B1 | * | 2/2001 | Ward et al. .............. 297/378.1 |
| 6,353,970 B1 | * | 3/2002 | Spaeth ......................... 16/360 |
| 6,357,828 B1 | * | 3/2002 | Sugimoto ................... 297/365 |
| 6,513,876 B1 | * | 2/2003 | Agler et al. ........... 297/378.14 |
| 6,983,994 B2 | * | 1/2006 | Pino ..................... 297/378.12 |
| 2002/0125756 A1 | | 9/2002 | Asano |
| 2002/0135215 A1 | | 9/2002 | Magyar et al. |
| 2004/0090101 A1 | | 5/2004 | Andersson et al. |

FOREIGN PATENT DOCUMENTS

JP       2003310374       11/2003

* cited by examiner

*Primary Examiner*—Milton Nelson, Jr.
(74) *Attorney, Agent, or Firm*—Gifford, Krass, Sprinkle, Anderson & Citkowski, P.C.

(57) ABSTRACT

A buzz, squeak and rattle reducing stop rivet incorporated into at least one of first and second side locations of a seat assembly frame, the frame including a seat back pivotally actuated relative to a seat bottom. The stop rivet includes an elongated and substantially cylindrical shaped body exhibiting an annularly protruding, deformable and resilient O-ring, such as seated upon an annular recess defined about the body. The body is adapted to being secured to the seat back offset from its pivotal location relative the seat bottom and such that the O-ring member biases against a first location of the seat bottom at an upright position of the seat back as well as against a second location of the seat bottom at a folded floor position of the seat back.

20 Claims, 3 Drawing Sheets

O-RING GROOVED STOP RIVET FOR REDUCING BUZZ, SQUEAK AND RATTLE ASSOCIATED WITH A MOTOR ACTUATED SEAT ASSEMBLY BETWEEN UPRIGHT DESIGN AND LOAD FLOOR POSITIONS

BACKGROUND OF THE INVENTION

1. Field of the Invention

The present invention discloses a modified stop rivet design incorporated into a motorized vehicle seat assembly. More specifically, the stop rivet incorporates a rubberized outer ring, and which functions as a support pin to provide protection against buzz (i.e., vibration), squeak and rattle between a fixed seat frame and a pivotally associated seat back arm between design (upright) and load (floor) positions.

2. Description of the Prior Art

The prior art is documented with examples of vehicle reclining control and impact mechanisms. A first example is set forth in Andersson, U.S. Patent Application Publication No. 2004/0090101, which teaches a vehicle seat recliner assembly including an impact control mechanism operatively connected between a seat back and seat bottom. The impact mechanism selectively allows movement of the seat back relative to the seat bottom and includes a release plate movable between first and second positions and a crash latch which selectively engages the seat support member depending upon the position of the release plate.

Magyar, U.S. Patent Publication No. 2002/0135215, teaches a recliner assembly with a seat bracket fixed to a seat back and rotatably assembled to a seat cushion bracket. A shaft is rotatably journaled through inner and outer assembled discs. Of note, a striker pin extends outwardly from the seat back bracket and is selectively engaged by a pivotal latch link mounted to the outer disc in order to permit selective pivotal motion of the seat back. A biasing member includes first and second ends extending between the outer disc and latch link for continuously biasing the slot into latching engagement with the striker pin at the lower end of the seat back bracket.

Asano, U.S. Patent Application Publication No. 2002/0125756, teaches a reclining mechanism having first and second arm members secured, respectively, to the frame structure of a seat cushion and backrest of the vehicle seat. A hinge pin pivotally interconnects the first and second arms and includes a semicircular ratchet portion concentric with the hinge pin. Additional features include the provision of a slide pawl and cam element for selectively disengaging the slide pawl from the ratchet portion of the first arm member. The hinge pin is loaded by a torsion spring to bias the cam element in the lateral direction for maintaining the slide pawl in engagement with the ratchet portion of the second arm member.

Sugimoto, U.S. Pat. No. 6,357,828, teaches a seat reclining apparatus with vibration sound insulation and which includes a pair of base plates adapted to be secured to a seat cushion and a pair of arm plates secured to a seat back. An interlocking shaft allows pivotal movement of the pair of arm plates at substantially the same time relative to the pair of base plates. A link plate is formed on the interlocking shaft, through an opening of which is attached a sound insulating member. A pin connects with one of the arm plates and is disposed through the opening of the link plate such that the pin is allowed to sound attenuatingly abut against the inside edge of the sound-insulating member when the link plate is rotated by the interlocking shaft.

Idlani et al., U.S. Pat. No. 5,156,439, teaches a recliner mechanism for a seat assembly in which the seat back is pivotally mounted to the seat cushion by an eccentric pivot pin, and which enables the location of the seat back pivot point to be adjusted during assembly. The seat back forms a sector gear meshing with a pinion gear on a seat cushion as part of the recliner mechanism and, by adjusting the position of the seat back pivot point, backlash between the sector gear and pinion gear is eliminated.

Finally, Sweers, U.S. Pat. No. 4,822,092, discloses a composite anchor for mounting a seat cushion frame to a vehicle floor panel. Of note, the anchor member includes a plastic lower shell bonded to an upper rubber seal ring, which provides a right-angled section defining a horizontal sealing lip portion and vertical neck portion formed with a resilient shoulder adapted to lockingly engage a rolled edge of a floor panel aperture.

SUMMARY OF THE PRESENT INVENTION

The present invention discloses a buzz, squeak and rattle reducing stop rivet incorporated into at least one of first and second side locations of a seat assembly frame. The frame includes a seat back pivotally actuated relative to a seat bottom. Specifically, the frame is constructed so as to include first and second sidemost extending seat back arms, each of which is secured by a pivot pin to an axially aligning location of an associated and floor mounted seat bottom support.

The stop rivet associated with each assembly includes an elongated and substantially cylindrical shaped body exhibiting an annularly protruding, deformable and resilient O-ring. The O-ring typically seats within an annular extending recess defined in an outermost circumferentially projecting portion of the rivet body.

The body is adapted to being secured to the seat back, offset from its pivotal location relative the seat bottom, and such that the O-ring member biases against a first location of the seat bottom at an upright position of the seat back. Motorized actuation of the seat back relative to the seat bottom, typically accomplished by a rotatable screw translating relative to a coupling arrangement with the seat back, causes the seat back to pivot to a second abutting location of the seat bottom, corresponding to a folded floor position of the seat back, and without the incidence of squeaking, rattling or other undesirable vibrations.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
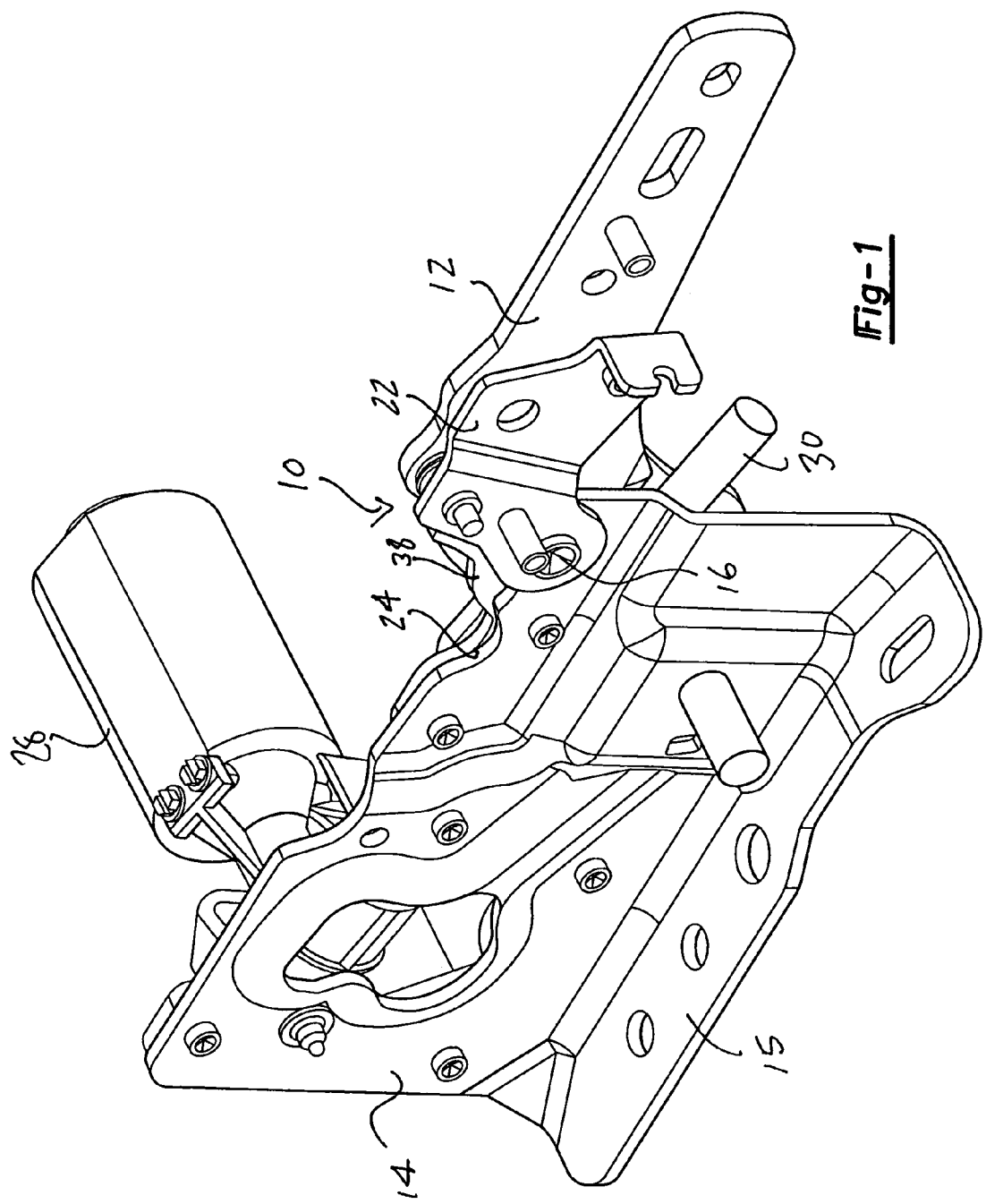
FIG. 1 is a perspective view of the motor actuated seat assembly incorporating the buzz/squeak/rattle preventative O-ring stop rivet according to the present invention.

Referring now to FIG. 1, a modified stop rivet is illustrated at 10 and which is incorporated into a motorized vehicle seat assembly according to the present invention. Although not illustrated, it is understood that the present invention discloses a buzz (vibration), squeak and rattle reducing stop rivet incorporated into at least one of first and second opposite side locations of a seat assembly frame.

As best illustrated in FIG. 1, the frame includes a seat back arm 12 pivotally actuated relative to a seat bottom 14 (see further pivot axis 16 established by a pivot pin or other suitable coupling structure permitting for rotation of the associated components). The seat bottom 14 typically includes an angled bottom lip 15 (again FIG. 1), through which are defined a number of apertures for receiving mounting bolts to secure to a floor location of a vehicle interior (not shown).

Although not further shown, the frame is constructed so as to include first and second sidemost extending seat back arms, each of which is secured by a pivot pin to an axially aligning location of an associated and floor mounted seat bottom support. For purposes of the present description, FIG. 1 illustrates in perspective a right side motorized seat actuation subassembly, it being understood that an identically configured left side subassembly can be incorporated.

The stop rivet 10 associated with each assembly includes an elongated and substantially cylindrical shaped body, typically constructed of a durable steel material, and exhibiting an annularly protruding, deformable and resilient member preferably in the form of an O-ring 18. In a preferred variant, the O-ring seats within an annular extending recess (see at 20 in FIG. 2) defined in an outermost circumferentially projecting portion of the rivet body. The O-ring 18 is preferably constructed of a rubberized material, but may also include a plasticized (e.g. durable nylon) or other material exhibiting the necessary properties of durability and some degree of pliancy in use.

Figure 3:
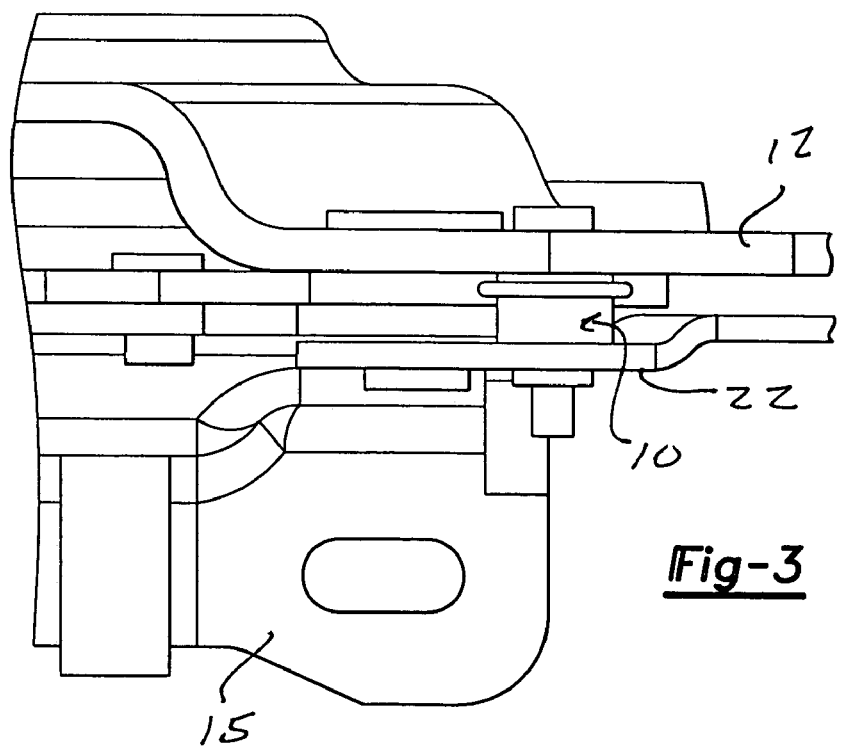
FIG. 3 is a top plan view of the seat assembly illustrated in FIG. 1 and showing the buzz/squeak/rattle preventative stop rivet in the floor load position according to the present invention.
Figure 4:
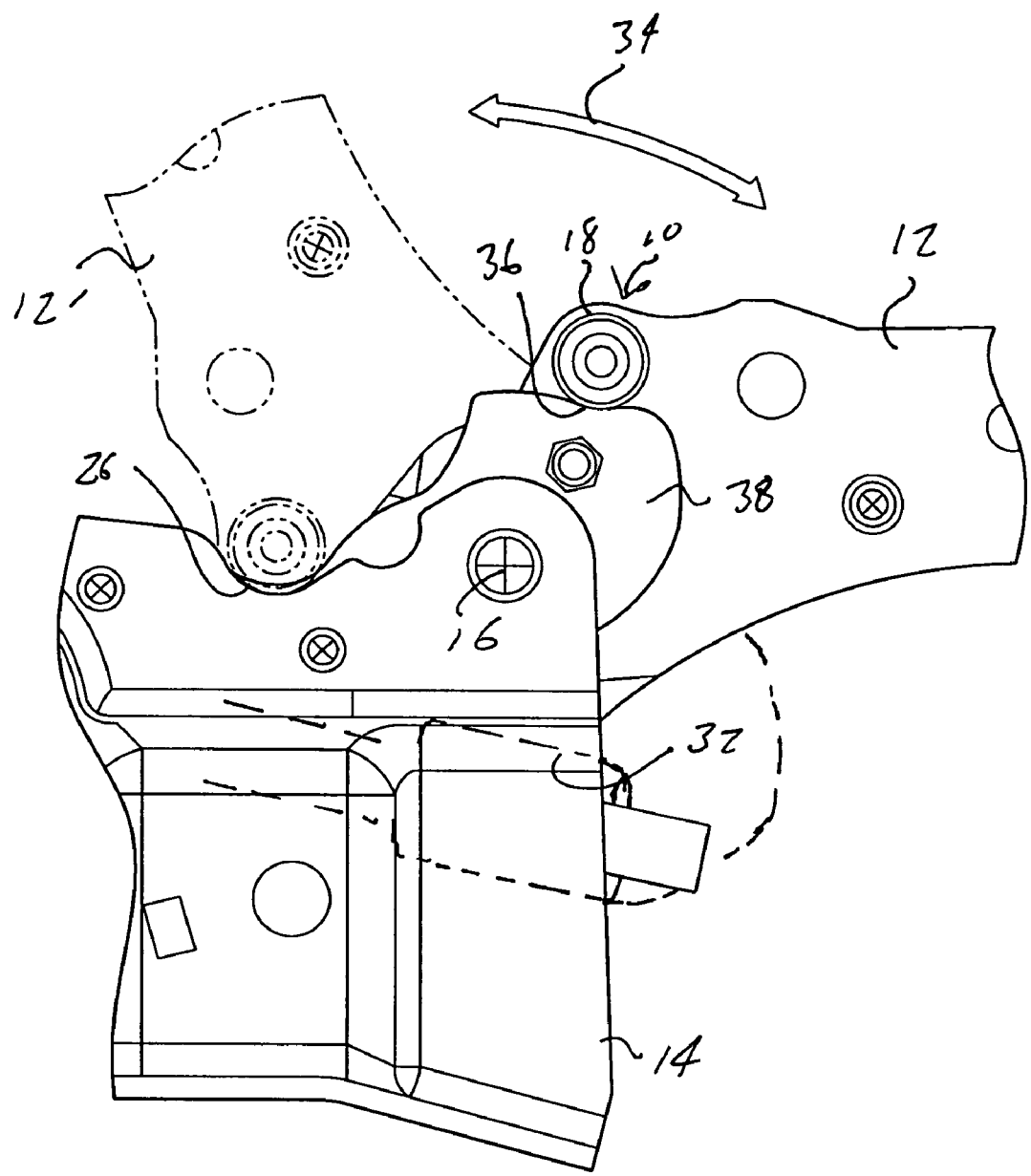
FIG. 4 is a corresponding side plan view of the illustration of FIG. 3 and further showing the seat back arm pivoting between upright design and load floor positions.

A support bracket 22 (illustrated in each of FIGS. 1-3 but removed for clarity of illustration in FIG. 4) is provided and which is secured in overlapping and spaced fashion relative to an opposing surface of the seat back arm 12. Specifically, the pivot pin 16 passes through an aperture defined in the support bracket 22 and such that the arm 12 and bracket 22 are located on opposite facing sides of the seat bottom 14 when viewed from the top plan view of FIG. 3.

Figure 2:
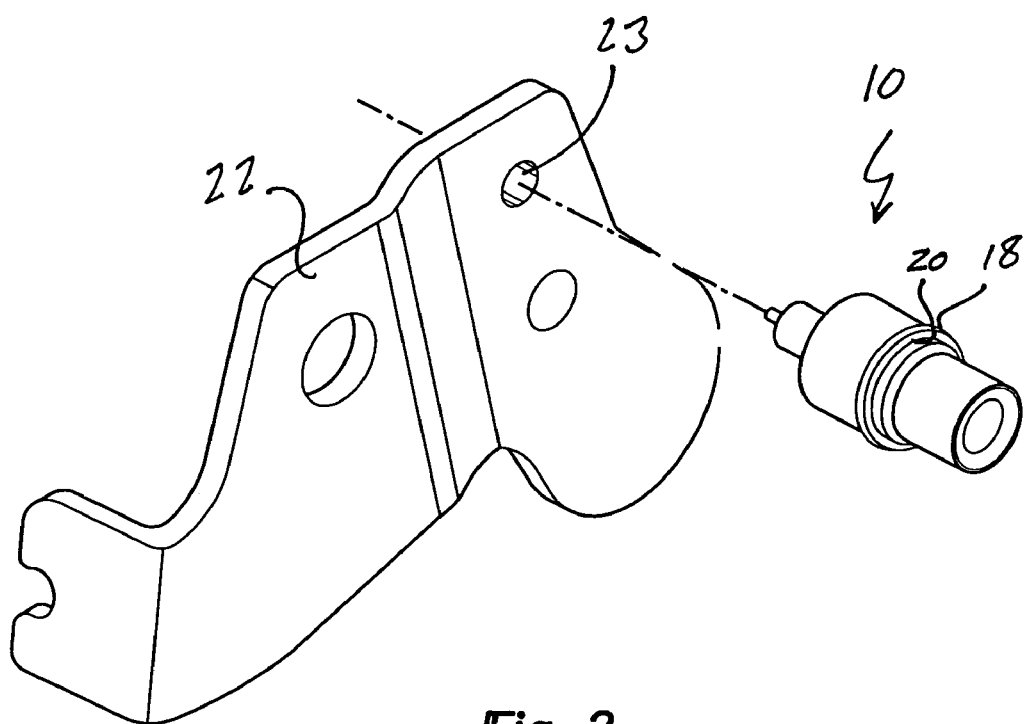
FIG. 2 is a rotated sectional perspective of the stop rivet and associated support bracket secured to the pivotal seat back arm.

The stop rivet 10 further passes crosswise between the spaced apart arm 12 and support bracket 22 (see as further shown by aperture 23 defined in the bracket 22 as shown in FIG. 2), further such that the O-ring 18 is arranged in parallel inter-disposed fashion in the space established between the seat back arm and bracket. As is also shown, the substantially cylindrical shape of the stop rivet body 10 further includes an outermost circumferentially expanded location about which is seated the O-ring 18. Reduced diameter portions of the one-piece stop rivet extend from either end of the outermost portion and seat through the associated and aligning apertures defined in the seat back arm 12 and support bracket 22.

As best illustrated with reference to FIG. 4, and again with the support bracket 22 removed for purposes of ease of illustration, the stop rivet body 10 is adapted to being secured in crosswise extending fashion relative to an upper arcuate extending edge 24 of the seat bottom, offset from the pivotal location 16. The annularly encircling O-ring member 18 biases against a first location 26 (see FIG. 4) of the seat bottom upper edge 24, this corresponding to an upright position of the seat back, as further illustrated in phantom at 12'. This is known in the relevant technical art as an upright or design position and typically corresponds to a rearwardmost pivoted location of the seat back relative to the seat bottom.

An electrically operated motor 28 is mounting to the seat bottom 14, and includes an elongate extending and rotatable drive screw 30. The screw 30 contacts the seat back 12, in rotatively permissive fashion such as is illustrated by the linearly traversable coupling 32 illustrated in phantom in FIG. 4 (see also multi-directional arrow 34 corresponding to the pivoting support established at the lowermost edge of the support arm), and at a spaced distance from its pivotal connection 16 with the seat bottom 14 opposite a spaced location of said stop rivet support body 10.

Motorized actuation of the seat back relative to the seat bottom, typically accomplished by rotation of the screw 30, thus causing the coupling 32 to translate therealong the screw 30, in turn causes the seat back to pivot to a second abutting location 36 (see again FIG. 4) of the seat bottom. The seat bottom includes an upwardly and forwardly directed extension 38 (FIG. 4) providing a support surface for the second abutting location and which, in combination with the geometry of the seat back arm 12, corresponds to a folded floor position of the seat back, this again occurring without the incidence of squeaking, rattling or other undesirable vibrations.

It is also envisioned that other alternate configurations can be employed in the shaping of the structurally supporting stop rivet, the objective being the ability to reduce or attenuate sound, vibrational or other undesirable characteristics of "looseness" in the connection between the seat back arm and seat frame, and which would otherwise result in a customer perception of reduced quality and durability of the assembly. It is also envisioned that the structural support of the present invention can be utilized with both motorized and non-motorized adjustable seat assemblies.

Having described our invention, other and additional preferred embodiments will become apparent to those skilled in the art to which it pertains, and without deviating from the scope of the appended claims.

We claim:

1. A structural support incorporated into a side location of a seat assembly frame for providing vibration and sound dampening of a seat back pivotally actuated relative to a seat bottom, comprising:
   - a three-dimensional shaped body exhibiting a deformable and resilient member arranged in extending fashion about an outer surface thereof; and
   - said body adapted to being secured to the seat back offset from its pivotal location relative the seat bottom;
   - said resilient member biasing against a first location of the seat bottom at an upright position of said seat back, said resilient member biasing against a second location of the seat bottom at a folded floor position of the seat back.

2. The structural support as described in claim 1, said body exhibiting a specified shape and size, electrically operated motor mounting to the seat bottom and driving an elongate and rotatable drive screw contacting the seat back, in rotatively permissive fashion, a spaced distance from its pivotal connection with the seat bottom opposite a spaced location of said body.

3. The structural support as described in claim 1, said body having a specified shape and size and being constructed of a durable steel material.

4. The structural support as described in claim 1, said resilient member having a specified shape and size and further being constructed of at least one of a rubberized or plasticized material.

5. The structural support as described in claim 1, said support having a specified shape and size and being located on each of first and second opposite sides of the seat bottom.

6. The structural support as described in claim 1, said body exhibiting a specified shape and size, the seat bottom including an arcuate upper edge defining said first and second locations.

7. The structural support as described in claim 6, said body having a specified shape and size, the seat bottom including an upwardly and forwardly directed extension providing a support surface for said second biasing location.

8. The structural support as described in claim 1, said body exhibiting a specified shape and size, the seat bottom including an arcuate upper edge defining said first and second locations.

9. The structural support as described in claim 8, said body having a specified shape and size, the seat bottom including an upwardly and forwardly directed extension providing a support surface for said second biasing location.

10. The structural support as described in claim 1, said body having a specified shape and size and being mounted in extending fashion between the seat back and a spaced apart and mounted support bracket.

11. The structural support as described in claim 10, said body having a specified shape and size. said resilient member extending in substantially parallel fashion along a space defined between the spatially separated seat back and support bracket.

12. The structural support as described in claim 10, said resilient member further comprising a rubber O-ring seating upon an annular shaped recess defined in said body.

13. The structural support as described in claim 12, said body further comprising a substantially cylindrical shape exhibiting at least one circumferentially enlarged portion within which is seated said O-ring.

14. The structural support as described in claim 13, said cylindrical shaped body further comprising at least one circumferentially reduced portion extending along an axial direction relative to said circumferentially enlarged portion.

15. A structural support incorporated into at least one side location of a seat assembly frame for providing vibration and sound dampening of a seat back pivotally actuated relative to a seat bottom, comprising:

an elongated and substantially cylindrical shaped body exhibiting a deformable and resilient member arranged in extending fashion about an outer annular surface thereof, said body adapted to being secured to the seat back offset from its pivotal location relative the seat bottom; and said resilient member further comprising a rubberized O-ring biasing against a first location of the seat bottom at an upright position of said seat back, said resilient member biasing against a second location of the seat bottom at a folded floor position of the seat back.

16. The structural support as described in claim 15, further comprising an annular shaped recess defined in said body and upon which is seated said O-ring.

17. The structural support as described in claim 15, said cylindrical shaped body further comprising at least one circumferentially reduced portion extending along an axial direction relative to a circumferentially enlarged portion supporting said O-ring.

18. The structural support as described in claim 15, said body having a specified shape and size, said resilient member extending in substantially parallel fashion along a space defined between the seat back and a spatially separated support bracket.

19. The structural support as described in claim 15, said support having a specified shape and size and being located on each of first and second opposite sides of the seat bottom.

20. A buzz, squeak and rattle reducing stop rivet incorporated into at least one side location of a seat assembly frame including a seat back pivotally actuated relative to a seat bottom, said stop rivet comprising:

an elongated and substantially cylindrical shaped body exhibiting an annularly protruding, deformable and resilient O-ring, said body adapted to being secured to the seat back offset from its pivotal location relative the seat bottom; and said O-ring biasing against a first location of the seat bottom at an upright position of said seat back, said resilient O-ring biasing against a second location of the seat bottom at a folded floor position of the seat back.

* * * * *